(12) United States Patent
Redmann

(10) Patent No.: US 9,843,793 B2
(45) Date of Patent: Dec. 12, 2017

(54) OPTICAL COMPENSATION FOR GHOSTING IN STEREOSCOPIC DISPLAYS

(75) Inventor: William Gibbens Redmann, Glendale, CA (US)

(73) Assignee: THOMSON LICENSING, Issy Les Moulineaux (FR)

( * ) Notice: Subject to any disclaimer, the term of this patent is extended or adjusted under 35 U.S.C. 154(b) by 1594 days.

(21) Appl. No.: 13/386,945

(22) PCT Filed: Jul. 29, 2010

(86) PCT No.: PCT/US2010/002121
§ 371 (c)(1),
(2), (4) Date: Jan. 25, 2012

(87) PCT Pub. No.: WO2011/016845
PCT Pub. Date: Feb. 10, 2011

(65) Prior Publication Data
US 2012/0127287 A1 May 24, 2012

Related U.S. Application Data

(60) Provisional application No. 61/273,544, filed on Aug. 5, 2009.

(51) Int. Cl.
*H04N 13/04* (2006.01)
*H04N 13/00* (2006.01)

(52) U.S. Cl.
CPC ..... *H04N 13/0497* (2013.01); *H04N 13/0018* (2013.01); *H04N 13/0425* (2013.01); *H04N 13/0427* (2013.01); *H04N 13/0459* (2013.01)

(58) Field of Classification Search
CPC ........... H04N 13/0018; H04N 13/0425; H04N 13/0459; H04N 13/0497
See application file for complete search history.

(56) References Cited

U.S. PATENT DOCUMENTS 6,532,008 B1 3/2003 Guralnick
8,754,903 B2 6/2014 Kim et al.
(Continued)

FOREIGN PATENT DOCUMENTS

CN 1394084 A 1/2003
CN 1953563 A 4/2007
(Continued)

OTHER PUBLICATIONS

Klimenko et al, "Reducing Optical Crosstalk in Affordable Systems of Virtual Environment", Proceedings of the 2003 International Conference on Cyberworlds (CW'03), 2003 IEEE, 2003.
(Continued)

*Primary Examiner* — Dave Czekaj
(74) *Attorney, Agent, or Firm* — Brian J. Dorini; Patricia A. Verlangieri

(57) ABSTRACT

A method for reducing crosstalk in stereoscopic displays comprises providing a first first-eye image, a compensated image of the first first-eye image, a first other-eye image, and a compensated image of the first other-eye image; displaying each of the images at least once during a single frame flash sequence, wherein the first first-eye image is displayed to a first eye, the compensated image of the first first-eye image is displayed to another eye, the first other-eye image is displayed to the another eye, and compensated image of the first other-eye image is displayed to the first eye; wherein the compensated images can be displayed simultaneously and/ or at least one of the compensated images or eye images can be displayed more than one time during a single frame flash sequence.

10 Claims, 5 Drawing Sheets

(56) References Cited

U.S. PATENT DOCUMENTS

| | | |
|---|---|---|
| 2002/0196199 A1* | 12/2002 | Weitbruch et al. ............... 345/6 |
| 2003/0112507 A1* | 6/2003 | Divelbiss et al. ............ 359/464 |
| 2006/0072215 A1 | 4/2006 | Nishi |
| 2006/0268104 A1* | 11/2006 | Cowan et al. .................. 348/42 |
| 2007/0091058 A1 | 4/2007 | Nam et al. |
| 2008/0036696 A1 | 2/2008 | Slavenburg et al. |
| 2008/0151040 A1* | 6/2008 | Kim ............................... 348/42 |
| 2008/0303962 A1 | 12/2008 | Tomita et al. |
| 2009/0168022 A1 | 7/2009 | Lee et al. |
| 2009/0237495 A1* | 9/2009 | Kawahara ...................... 348/56 |
| 2010/0158129 A1 | 6/2010 | Lai et al. |
| 2011/0025832 A1 | 2/2011 | Cowan et al. |

FOREIGN PATENT DOCUMENTS

| | | |
|---|---|---|
| CN | 101320197 A | 12/2008 |
| EP | 1271965 A1 | 1/2003 |
| EP | 1271966 | 1/2003 |
| JP | 2000134644 A | 5/2000 |
| JP | 200154142 | 2/2001 |
| JP | 200370025 A | 3/2003 |
| JP | 200872699 A | 3/2008 |
| JP | 2009507401 A | 2/2009 |
| KR | 100916904 | 9/2009 |
| TW | 200928441 | 12/1996 |
| TW | 200915228 | 8/1997 |
| TW | 200416413 | 9/2004 |
| WO | WO 2006128066 | 11/2006 |
| WO | WO 2009088658 | 7/2009 |

OTHER PUBLICATIONS

Search Report dated Dec. 12, 2010.

* cited by examiner

OPTICAL COMPENSATION FOR GHOSTING IN STEREOSCOPIC DISPLAYS

CROSS-REFERENCE TO RELATED APPLICATIONS

This application claims the benefit of the filing date of U.S. Provisional Application Ser. No. 61/273,544, filed on Aug. 5, 2009, titled "Optical Compensation For Ghosting In Stereoscopic Displays", the contents of which are hereby incorporated by reference in their entirety for all purposes.

This application claims the benefit, under 35 U.S.C. §365 of International Application PCT/US2010/002121, filed 29 Jul. 2010, which was published in accordance with PCT Article 21(2) on 10 Feb. 2011, in English.

The invention relates to stereoscopic displays and methods displaying of stereoscopic images.

BACKGROUND OF THE INVENTION

Stereoscopic display systems are supposed to deliver a discrete left-eye image and a discreet right-eye image to the respective viewer's eyes. However many single-screen displays such as video monitors or projection screens, when used for stereoscopic display, exhibit crosstalk, wherein each eye not only receives the image intended for it, but also the image intended for the other eye at a reduced intensity. This results in 'ghosts,' where each eye sees objects on the display, with a faint copy of the object nearby.

Ghost-compensation systems can compute a pair of compensated images that are projected for viewing by each eye. The compensated image for the left eye is equal to the image intended for the left eye minus an intensity-scaled version of the image intended for the right eye, and vice versa. The amount of the intensity scaling is approximately equal to the amount of the crosstalk.

Thus, in a system having a crosstalk c, left eye image L and right eye image R, the compensated image for the left eye L' would equal L-cR and the compensated image for the right eye R' would equal R-cL.

When the compensated images L' are projected for viewing by the respective eye in the presence of the crosstalk, what is perceived by the left eye would be L'+cR' or (L-cR)+c(R-cL), which is about $(1-c^2)$ L. In other words, this is an image having no ghosting from the right eye image. Likewise, when the compensated images R' are projected for viewing by the respective eye in the presence of the crosstalk, what is perceived by the right eye would be R'+cL' or (R-cL)+c(L-cR), which is about $(1-c^2)$ R.

Systems such as those described by Cowan et. al in U.S. Patent Application Publication No. 20060268104 entitled "Ghost-Compensation for Improved Stereoscopic Projection," the compensated images can be pre-computed and stored for later playback, or can be computed on the fly in real-time during playback of non-compensated images.

The drawback of pre-computing the compensated images is that different stereoscopic display systems can exhibit different crosstalk values, in which case the pre-computed compensated images suitable for one stereoscopic display are not well suited for another. This produces an inventory control problem, where the operator of a display system must acquire the version of a presentation prepared for the correct crosstalk value.

While a real-time ghost-compensation system can be configured to match the crosstalk of stereoscopic display, for systems involving one or more of high resolution, high frame rate, non-linear encoding, or encryption, the cost and complexity of the decryptions, transforms, frame buffers, array math, inverse transforms, re-encryption, etc. is substantial. The latency of such a system can affect the lip-sync of a presentation. The security requirements associated with content can require additional decryption and encryption keys, which must be inventoried, tracked, and managed.

Thus, there is a significant need for a ghost-compensation system that is real-time but does not require any additional transforms or encryption steps. There is also a need for this system to compensate for a wide range of crosstalk values.

SUMMARY OF THE INVENTION

A method for reducing crosstalk in stereoscopic displays is provided which comprises the steps of providing a first first-eye image for display, an inverse image of the first first-eye image, a first other-eye image for display, and an inverse image of the first other-eye image; displaying the first first-eye image to a first eye during a first interval; displaying the inverse image of the first first-eye image to another eye during a second interval, the second interval being shorter than the first interval; displaying the first other-eye image to the another eye during a third interval, the third interval being the same duration as the first interval; and displaying the inverse image of the first other-eye image to the first eye during a fourth interval, the fourth interval being the same duration as the second interval. The method can further comprise displaying the first first-eye image to the first eye during a fifth interval, the fifth interval being the same duration as the first interval; displaying the inverse image of the first first-eye image to the another eye during a sixth interval, the sixth interval being shorter than the first interval; displaying the first other-eye image to the another eye during an seventh interval, the seventh interval being the same duration as the first interval; displaying the inverse image of the first other-eye image to the first eye during a eighth interval, the eight interval being the same duration as the second interval. The method can further comprise additional displaying step of the images, which can assist in minimizing perceived flicker.

A display, which can be a digital micromirror display (DMD), is also provided which comprises a video data interface adapted to receive video data and form separate frames of first eye image data and a second eye image data, a frame buffer means adapted to receive and write into memory the image data from the video data interface, an image compensator means adapted to generate a compensated second eye image data for display to a first eye that is responsive to the second eye image data and a compensated first eye image data for display to a second eye that is responsive to the first eye image data, and a display controller adapted to cause the first eye image data and the compensated second eye image data to be displayed to the first eye, one after the other, and then to cause the second eye image data and the compensated first eye image data to be displayed to the second eye, one after the other. The display can further comprise a shift register that control pixels of the display. The compensated first and second eye image data can be inverse intensity data of the first and second eye image data, respectively. In the case of a DMD, the data output to control the micromirrors for the first eye can be a waveform pattern for the first eye image data and an inverted form of a waveform of the second eye image data; and the data output to control the micromirrors for the second eye can be a waveform pattern for the second eye image data and an inverted form of waveform of the first eye image data. The display can further be adapted to flash the first eye image data and the compensated second eye image data combination to the first eye and the second eye image data and the compensated first eye image data combination to the second eye more than once in alternating fashion. In the case of a DMD, the data output to control the micromirrors for the first eye can be a waveform pattern for the first eye image data and an inverted form of a waveform of the second eye image data; the data output to control the micromirrors for the second eye can be a waveform pattern for the second eye image data and an inverted form of waveform of the first eye image data and the intensity associated with the micromirrors can be responsive to the waveform patterns and expressed by multi-bit binary values having a most significant bit, intermediate bits and a least significant bit. The display can comprise a balancing means that establishes a ratio of duration of time or intensity that the first and second eye image data are displayed to that of the compensated second eye image data and compensated first eye image data, respectively, wherein the ratio can be greater than 1.

BRIEF DESCRIPTION OF THE DRAWINGS

The invention will now be described by way of example with reference to the accompanying figures wherein.

DETAILED DESCRIPTION OF THE EMBODIMENTS

Figure 1:
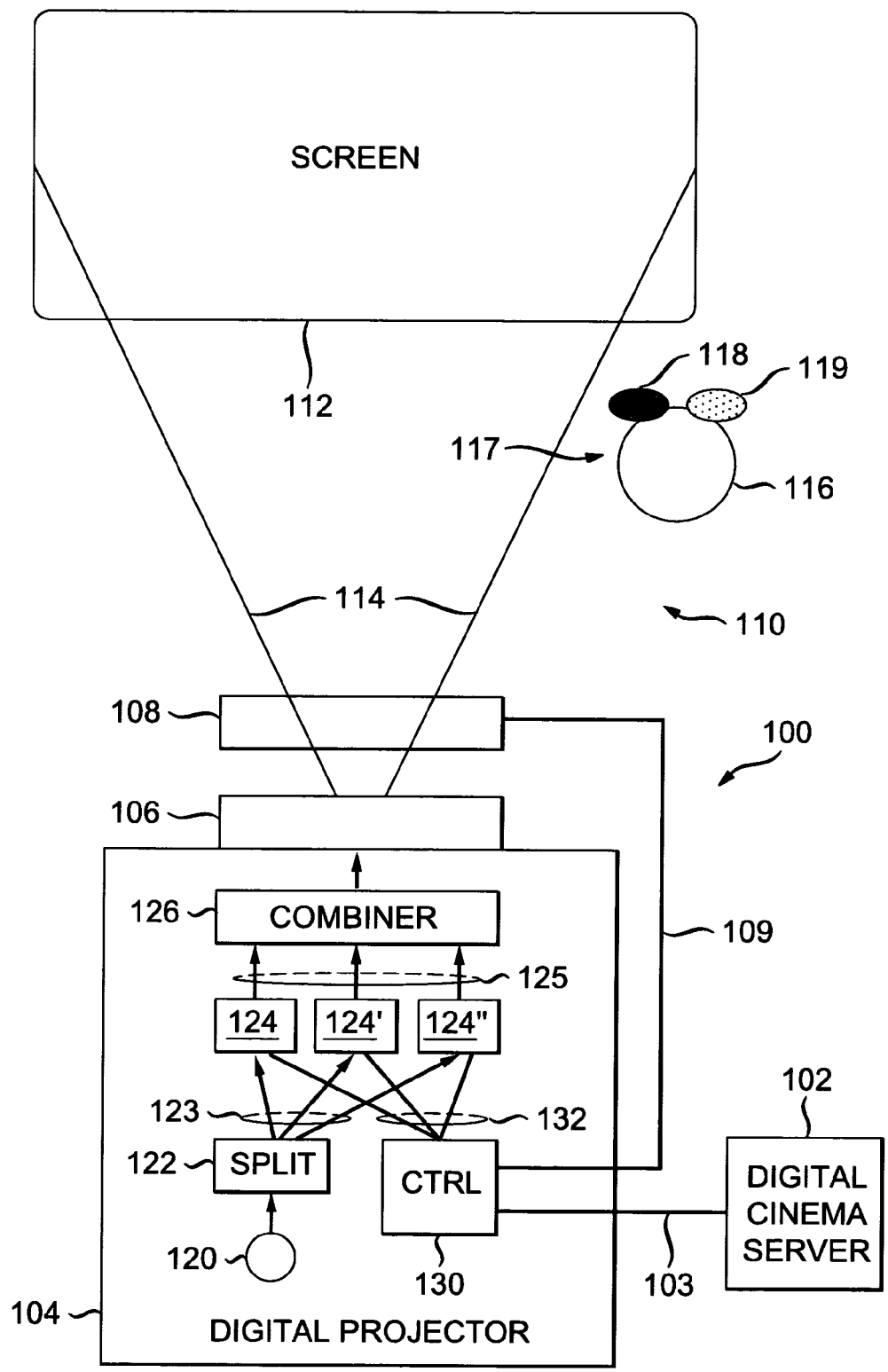
FIG. 1 is an exemplary display system of the present invention using a digital cinema projection system having crosstalk which displays stereoscopic images to a theatre audience and the inverse of the images to eliminate ghosting.

The disclosed embodiments will now be described and applied to stereoscopic displays having non-zero crosstalk. Generally, the presented invention provides reduced perception of ghosts by displaying for receipt by a viewer's left eye, for a first interval (e.g., 80% of ¼s second) an image intended for the left eye and for a second interval (e.g. 20% of ¼s second) an inverse of an image intended for the right eye; and, displaying for receipt by a viewer's right eye, for a third interval substantially equal to the first interval, the image intended for the right eye and for a fourth interval substantially equal to the second interval an inverse of the image intended for the left eye. The ratio of the second interval to the first interval is preferably equal to the amount of crosstalk (i.e., for the example, 20:80=25% crosstalk).

In general, this disclosure can be applied to electronically controlled stereoscopic display systems having crosstalk between the left and right eye images.

The disclosure calf work with autostereoscopic displays (e.g., a video monitor having a lenticular screen), and with stereoscopic display systems requiring an observer to wear glasses while observing the monitor or projection screen. In the case of systems requiring glasses, the present invention can work with linear or circular polarized glasses, active shutter glasses, anaglyphic, and comb-filter glasses.

Such display systems can comprise a video monitor or a projection screen. In the case of systems having a projection screen, the display system can comprise one or more projectors.

Images can be formed using a light-emitting diode (LED) array, liquid crystal display (LCD) panel, plasma display, deformable micro-mirror device (DMD), scanned laser, cathode ray tube (CRT), or other such electronically controlled image-forming devices.

Color images can be produced by sequentially producing a monochrome image for each of the color primaries (e.g., red, green, and blue); or by providing an integrated array having pixels of each primary color (e.g., a CRT with a color mask, or a plasma display having cells of each primary color); or by producing in parallel a monochrome image for each for the color primaries, which are then super-imposed for viewing by an observer (e.g., a three-gun video projector or a three-chip deformable mirror device projector).

In the exemplary, preferred embodiment discussed in detail herein, the stereoscopic display system is a digital cinema projector having separate red, green, and blue DMD imagers such as those based on the DLP™ technology developed and marketed by Texas Instruments, Inc. of Dallas, Tex. The DMD-based projector is augmented with an electronically switchable circular polarizer such as the Z-Screen marketed by Real-D Cinema of Beverly Hills, Calif. and the audience is provided with glasses having compatible circularly polarized lenses, such as those also provided by Real-D Cinema.

The embodiments are particularly applicable to systems which display color components sequentially (e.g., single DMD chip projectors using a color wheel to projected each image component) and in systems which display the left and right eye images through separate projectors each having a corresponding static polarizer or other encoder used to separate the left and right eye images for the observer.

Referring to FIG. 1, auditorium 110 is served by projection system 100. Projection system 100 preferably comprises a digital cinema server 102 that provides a stereoscopic program comprising a series of left and right eye images to digital projector 104 through connection 103.

In an alternative embodiment, projection system 100 can comprise a stereoscopic video feed of left and right eye images which can be live (e.g., a sports broadcast) or pre-recorded (e.g., from a stereoscopic DVD), for example as achieved using the Sensio® SD3-100 developed and marketed by Sensio Technologies, Inc., of Montreal, Quebec, Canada.

Inside projector 104, light source 120 is divided by chromatic splitter 122 to form red, green, and blue primary colored light on corresponding DMD imagers 124, 124', and 124". The component images from DMD imagers 124, 124', and 124", each in the corresponding primary color, are optically combined by combiner 126, and directed through lens 106. For example, chromatic splitter 122 will direct a portion of the spectrum from light source 120 to imager 124 as primary source 123. Imager 124 imposes the corresponding primary color component of the current image (either left or right eye) to produce spatially encoded light 125 which combiner 126 directs to lens 106 such that the current image forms projection 114 on screen 112. Note that chromatic splitter 122 and combiner 126 are typically implemented as a single assembly of prisms and chromatic beam splitters.

As left and right eye images are projected alternatingly through the lens 106, projection 114 is filtered by electronically switchable circular polarizer 108 before landing on polarization-preserving screen 112.

Members of the audience, such as observer 116 are supplied with glasses 117. Glasses 117 comprise left and right eye lenses 118 and 119, respectively, wherein each lens has an opposite polarization compatible with that imposed by electronic polarizer 108. Observer 116 views projection 114 on screen 112.

The opposite polarizations of the left and right eye images imposed by polarizer and/or encoder 108 on projection 114 must be preserved by screen 112 so that the left and right eye lenses 118 and 119 can substantially separate the left and right eye images so that they are only viewed by the corresponding left and right eyes of observer 116. Thus, the audience receives the discrete left and right eye images with their corresponding left and right eyes, and thus receives a stereoscopic presentation.

However, polarizers 108, 118, 119, and the screen 112 are not perfect. This results in leakage of the left and right eye images into opposite eyes of observer 116. This leakage or crosstalk leads to the perception by observer 116 of a ghosting in the stereoscopic presentation. However, for an image that produces a perceived luminance of X for its target eye, the other, oppositely polarized image produces a lower perceived luminance $c*X$, where 'c' is the crosstalk coefficient. Typical values for 'c' range from 5-20%, depending on the technology of the embodiment and the current state (e.g., whether or not screen 112 or polarizer 108 is clean or dirty).

One technique for ghost cancellation that had been used is to display pre-processed stereoscopic images that have an embedded compensation for a specific, expected value of c. In this technique, the pre-processed left eye image L' is computed by multiplying the intensity values of the original right eye image R by c and subtracting that product from the original left eye image L, that is $L'=L-(c*R)$. Similarly, $R'=R-(c*L)$. A variation of this technique is taught by Lipscomb and Wooten in "Reducing Crosstalk Between Stereoscopic Views" published in the Proceedings of the Society of Photo-Optical Instrumentation Engineers (SPIE), volume 2177, in 1994. A variety of methods and equipment for producing such pre-processed images is taught by Cowan et al in U.S. Patent Application Publication No. 20060268104.

In the current disclosure, the stereoscopic images are not necessarily pre-processed. Rather, unprocessed left and right eye images are projected normally for a portion of the time during which they are normally projected. In the remaining portion of the time during which they are normally projected, the corresponding other image is projected, but is intensity-inverted, i.e., bright parts of the image are dark and dark regions of the image are light.

Figure 2:
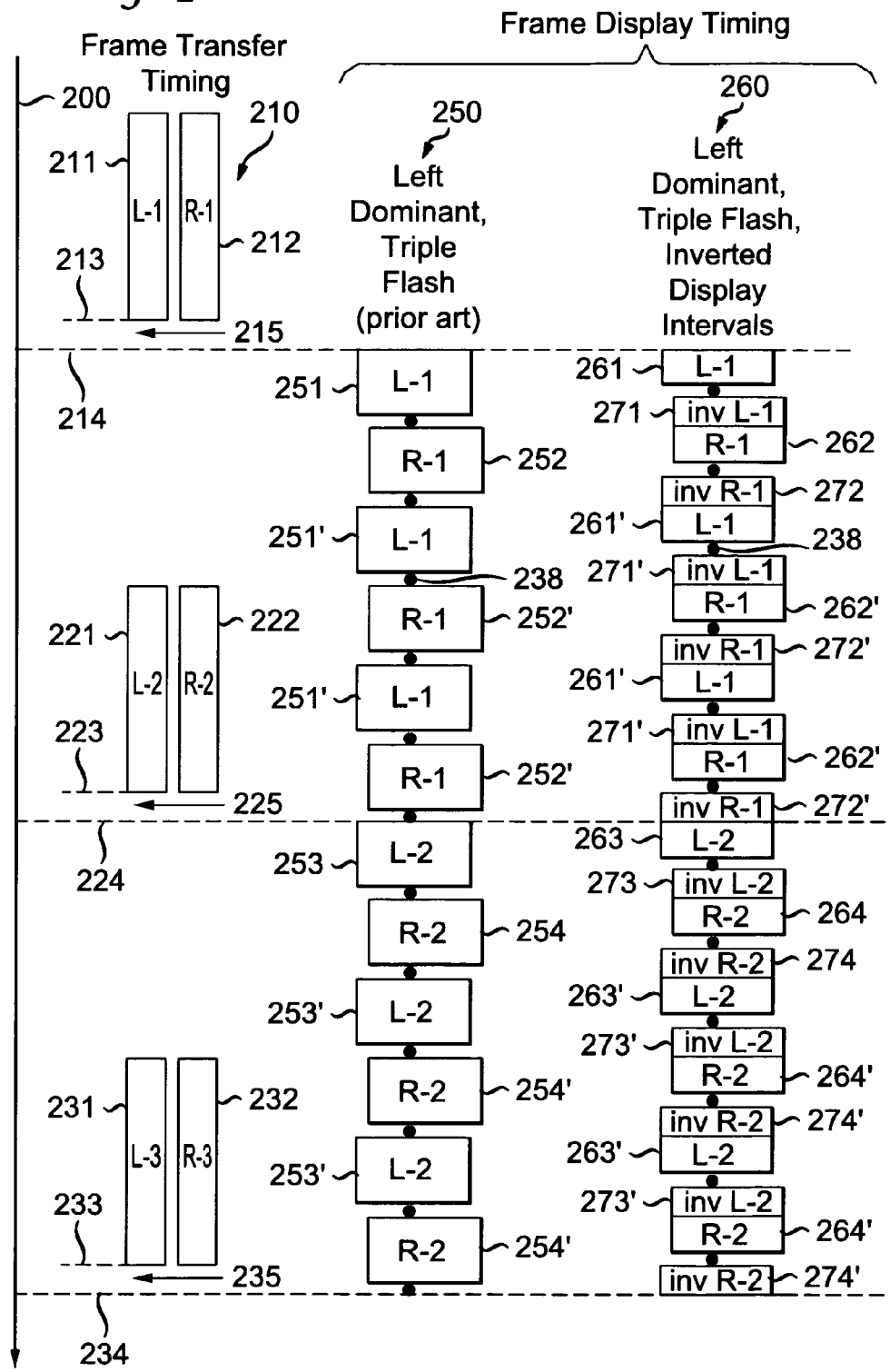
FIG. 2 is a timing diagram showing a preferred relationship between receipt of stereoscopic images and the display of images and the inverse of the images to the left and right eyes of an observer.

Referring to FIG. 2, a preferred timing diagram is shown in which arrow 200 indicates the progress of time. Transfer 210 of left and right eye images over connection 103 occurs regularly, with the beginning of consecutive image pairs occurring at display start times 214, 224, and 234 for which corresponding deadlines 213, 223, and 233 provide corresponding setup times 215, 225, and 235.

Thus, a first left eye image 211 is delivered to projector 104 over connection 103 by deadline 213 and corresponding first right eye image 212 is also delivered over a connection with controller 130 by deadline 213.

Note that setup times 215, 225, and 235 are not to scale and in many actual embodiments can be significantly larger due to the nature of the image processing pipeline. In such embodiments, delay start times 214, 224, and 234 would move further down with respect to timeline 200, but deadlines 213, 223, and 233 would likely not. Thus, setup times 215, 225, and 235 are shown small in this figure for clarity.

In the same way, second left eye image 221 is received no later than deadline 223 as is corresponding second right eye image 222. Likewise, third left eye image 231 is received no later than deadline 233 as is corresponding third right eye image 232.

In this preferred embodiment, connection 103 can comprise a dual high-definition serial digital interface (dual HD-SDI), with one of the two HD-SDI links dedicated to the left eye images and the other to the right eye images, and the two links operating in substantial synchrony, meeting common deadlines 213, 223, and 233. In an alternative embodiment, corresponding left and right eye images can be delivered sequentially over connection 103, in which case the delivery deadlines would apply to the delivery of the latter of the left and right eye image pairs.

Stereoscopic projection timing 250 would flash each left eye image one or more times, with two or three times being preferred to minimize the perception of flicker by observer 116, and three times should be used in theatrical environments such as auditorium 110. Alternating with each flash of the left eye image would be the corresponding right eye image.

Thus, by stereoscopic projection timing 250, a first flash 251 of a first left eye image 211 with encoder 108 commanded by signal 109 to the state for viewing by the left eye. This is followed by encoder 108 being commanded by signal 109 to the state for viewing by the right eye after which a first flash 252 of a corresponding first right eye image 212 is displayed.

Throughout FIG. 2, those flashes that occur while encoder 108 is configured for the left eye (such as flashes 251, 251', 253, 253') are shown with a slight left offset, while those flashes that occur while encoder 108 is configured for the right eye (such as flashes 252, 252', 254, 254') are shown with a slight right offset. This offset in FIG. 2 is merely an indication in this figure to remind the reader of when the setting of the encoder 108 is intended to be selecting the left eye and when it is selecting the right eye.

After the first flashes 251 and 252 for first left and right eye images 211 and 212, second and third flashes 251' of left image 211 would alternate with second and third flashes 252' of right image 212, with encoder 108 changing to the appropriate state as commanded by signal 109.

Encoder 108 changes state between each consecutive flash. This state change preferably occurs entirely during switching times 238. During switching times 238, preferably no projection takes place, because any projection during switching time 238 will produce a substantially increased level of crosstalk, which is not desirable. This switching time 238 should take place each time the encoder 108 changes states.

Subsequently, a first flash 253 of second left eye image 221 is followed a first flash 254 of second right eye image 222. Next, second and third flashes 253' of left image 221 alternate with second and third flashes 254' of right image 222, all with intervening switching times. The alternating flashes (not shown) continue for third pair of left and right eye images 231 and 232 and so on. Throughout stereoscopic projection timing 250, encoder 108 is switching from left to right eye encoding and back, as previously described with transitions occurring each switching time 238.

In stereoscopic projection timing 250, use of the ghost compensation had required that left and right eye image pairs 211 and 212, 221 and 222, and 231 and 232 comprise pre-compensated images as described above, or that uncompensated images delivered to the projector 104 are processed during the setup intervals 215, 225, and 235 so that compensated images are available to be displayed.

To avoid this need for pre-compensating the images or performing the compensation in real-time, the stereoscopic projection timing with ghost compensation 260 is shown. Here, a first flash 261 of a first left eye image 211 is projected. As before, encoder 108 being configured for viewing by the left eye of observer 116 is indicated by the left offset of first flash 261 in FIG. 2. After a switching time, encoder 108 is configured for viewing by the right eye of observer 116, and for an interval a first flash 271 of the intensity-inverse of the first left eye image 211 is displayed. Without the encoder 108 switching, for a second interval, a first flash 262 of first right eye image 212 is displayed. After the second interval, encoder 108 is switched back to the left eye state, and after waiting for the switching time, a first flash 272 of the intensity-inverse of the first right eye image 212 is displayed.

If the ratio of the first interval (the duration of flash 271) to the second interval (the duration of flash 262) is 'i', then when the four flashes 261, 271, 262, and 272 are integrated by the left eye of observer 116 through glasses 117, observer 116 perceives $L+c*R+c*i*(1-L)+i*(1-R)$, where L is flash 261, $c*R$ is crosstalk of flash 262, $c*i*(1-L)$ is crosstalk of flash 271, and $i*(1-R)$ is flash 272.

If is selected to equal c, then this is $L+c*R+c^2-c^2L+c-c*R$.

Allowing the $c*R$ terms to cancel and considering the $c^2$ terms to be negligible when c is small, the perception of observer 116 is approximately $L+c$.

By symmetrical calculation and assumptions, through his right eye, observer 116 perceives $R+c*L+c^2*(1-R)+c*(1-L)$, where R is flash 262, $c*L$ is crosstalk of flash 261, $c^2*(1-R)$ is crosstalk of flash 272, and $c*(1-L)$ is flash 271, which is approximately $R+c$.

This corresponds to a complete ghost compensation at the penalty of raising the black level of the display by c relative to the maximum brightness of the images. Stereoscopic systems having low values of crosstalk are preferred because the raising of the black levels is minimized.

If the ratio of the first interval to the second interval is reduced, the rise in the black level will be reduced in approximate proportion. In some cases, this can be preferred though complete elimination of crosstalk is not achieved.

The cycle continues after the four flashes 261, 262, 271, and 272. The second and third flashes 261' of first left eye image 211 encoded for the left eye are followed by second and third flashes 271' of the inverse of first left eye image 211 encoded for the right eye. Then, the second and third flashes 262' of first right eye image 212 also encoded for the right eye are flashed followed by second and third flashes 272' of the inverse of first right eye image 212 encoded for the left eye.

While encoder 108 is still in the state for displaying to the left eye of observer 116, first flash 263 of second left eye image 221 is displayed. Encoder 108 is commanded by signal 109 to the state for right eye viewing, then first flash 273 of the inverse of second left eye image 221 is displayed, followed by first flash 264 of second left eye image 222. Signal 109 directs encoder 108 back to the state for left eye viewing, and first flash 274 of the inverse of second left eye image 222 is displayed.

Second and third flashes 263' of second left eye image 221 are displayed with encoder 108 in the left eye state. Second and third flashes 273' of the inverse of second left eye image 221 are displayed with encoder 108 in the right eye state. Second and third flashes 264' of second right eye image 222 are displayed with encoder 108 in the right eye state. Second and third flashes 274' of the inverse of second right eye image 222 are displayed with encoder 108 in the left eye state.

In another embodiment, the first flashes 261 and 262 of first left- and right-eye images 211 and 212 may occur simultaneously, for example in a configuration where there are two projectors 104, each configured to project exclusively to observer 116 through one of left- and right-eye lenses 118 and 119. Subsequently, each of first flashes 271 and 272 of the inverted images occur simultaneously. Note that for this dual-projector configuration, each projector must receive both the left- and right-eye images 211 and 212: one to be projected normally, and the other to be projected inverted.

In a related embodiment, each projector can selectively project to the observer 116 through either of lenses 118 and 119. Here, each projector receives only one of images 211 and 212, and projects the non-inverted image to one eye and the inverted image to the other eye of observer 116.

In still another embodiment, a single projector may project distinct images to each eye simultaneously, as with the Sony SRX-R220 4K single-projector system with a dual lens 3D adaptor such as the LKRL-A002, both marketed by Sony Electronics, Inc. of San Diego, Calif., U.S.A. in which a separate portion of each imager is dedicated to projecting to one or the other of left- and right-eye lenses 118 and 119. In this case, the portion of the imager that projects left-eye image 211 for viewing by observer 116 through left-eye lens 118 is also used to project the inverted right-eye image 212.

Figure 3:
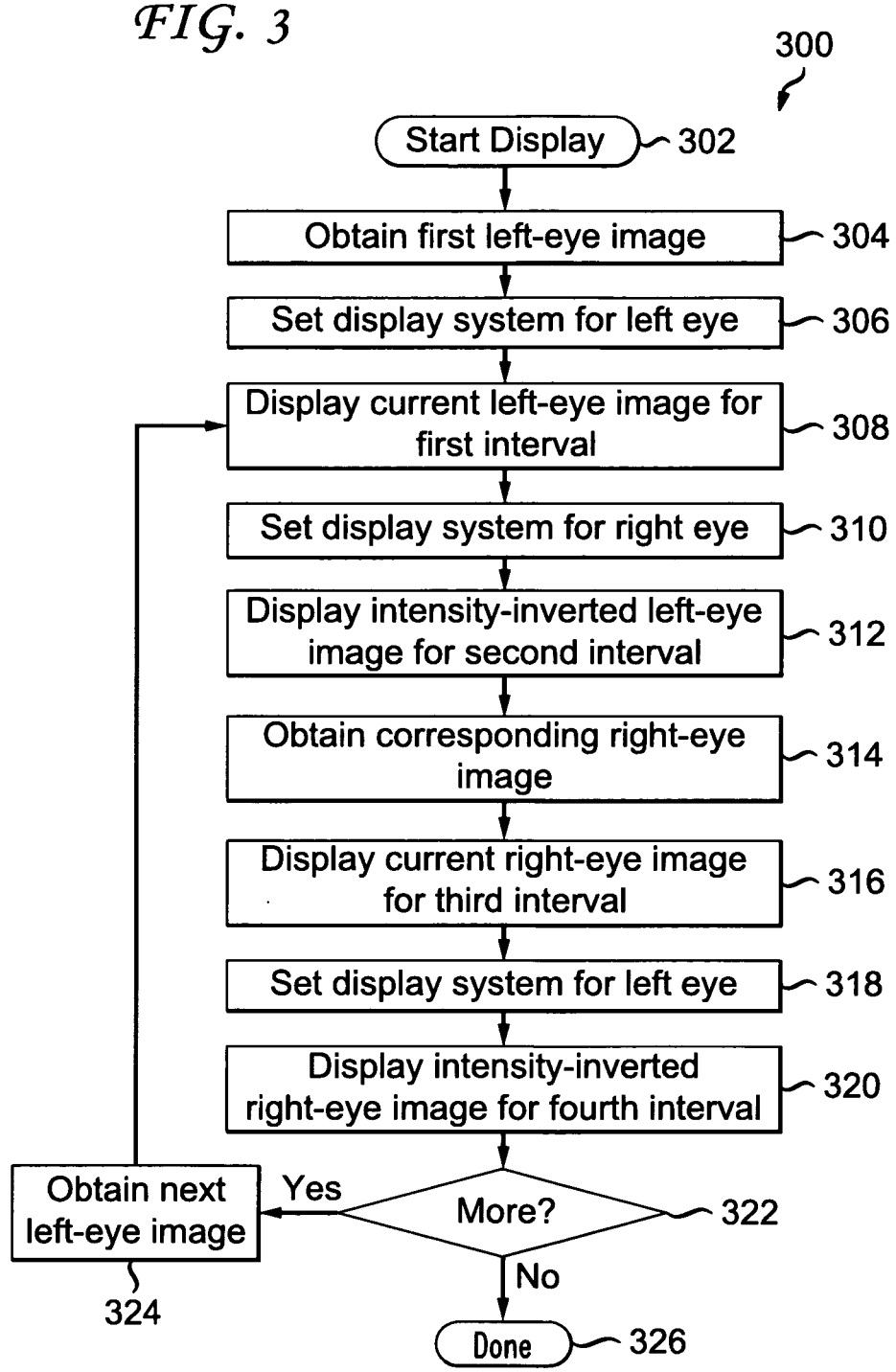
FIG. 3 is a flowchart of the process for eliminating ghosts by displaying stereoscopic images and the inverse of the images to an observer.

FIG. 3 describes the ghost compensation process 300 a different way. In the present disclosure, the ghost compensation process 300 begins at step 302 with the display being activated, for instance with lamp 120 being lit and projector 104 being set to a stereoscopic operating mode. In first left image acquisition step 304, a first left image 211 is acquired and decoded as necessary in preparation for display.

In set left step 306, encoder 308 is placed in the state for displaying to the left eye of observer 116. Preferably, no display takes place while encoder 308 is switching states.

In display left step 308, the current ready left eye image is displayed to the left eye of the observer 116 for a first interval.

In set right step 310, encoder 308 is placed in the state for displaying to the right eye of observer 116. Again, it is preferably for no display to take place while encoder 308 is switching states.

In display inverted left step 312, an intensity inverse of the current left eye image is displayed to the right eye of observer 116 for a second interval.

In right image acquisition step 314, the right eye image (e.g. 212) corresponding to the current left eye image (e.g., 211) is acquired and decoded as necessary in preparation for display.

In display right step 316, the current right eye image is displayed to the right eye of observer 116 for a third interval.

In set left step 318, encoder 308 is placed in the state for displaying to the left eye of observer 116. Preferably, no display takes place while encoder 308 is switching states.

In display inverted right step 320, an intensity inverse of the current right eye image is displayed to the left eye of observer 116 for a fourth interval.

In decision step 322, a determination is made as to whether there are more stereoscopic images to be displayed.

If so, stereoscopic display process 300 continues at step 324. If not, process 300 terminates at done step 326, during which projector 104 can be set to a non-stereoscopic mode, or can be shut down.

If there are more stereoscopic images to be displayed, then in next left image acquisition step 324, the next left image (e.g., 221) is acquired and decoded as necessary in preparation for display.

Process 300 continues by looping back to display left step 308.

Preferably, the first and third intervals are the same length. Preferably, the second and fourth intervals are the same length. For complete ghost compensation, the ratio of the second interval to the first interval should be equal to or commensurate with the crosstalk coefficient c. Likewise, the ratio of the fourth interval to the third interval should also be equal to or commensurate with c. It should be pointed out that with respect to time intervals, when they are expressed as being "the same," it is intended that this includes the scenario in which the values are substantially the same in duration to produce the desired effect.

If crosstalk varies by region across projection 114, whether due to the physics of encoder 108, screen 112, or glasses 117, the first, second, third, and fourth intervals can also vary by region (not shown), though it is preferred that the sum of the first and fourth intervals equals the sum of the second and third intervals in any region and that the interval endings immediately prior to a transition of encoder 108 (i.e. immediately prior to switching times 238) occur synchronously across all regions. Similarly, the interval beginnings immediately following a transition of encoder 108 (i.e., immediately following switching times 238) occur synchronously across all regions.

Note that for those embodiments previously discussed in which left- and right-eye images 211 and 212 may be projected simultaneously, an alternative version of ghost compensation process 300 (not shown) would perform steps 310 and 316 simultaneously, and step 312 and 320 simultaneously. Depending upon the projector configuration, projector eye selection steps 310 and 318 might occur simultaneously, or not at all (e.g., when a projector or a portion of the imager is dedicated to projection for a single eye).

Figure 4:
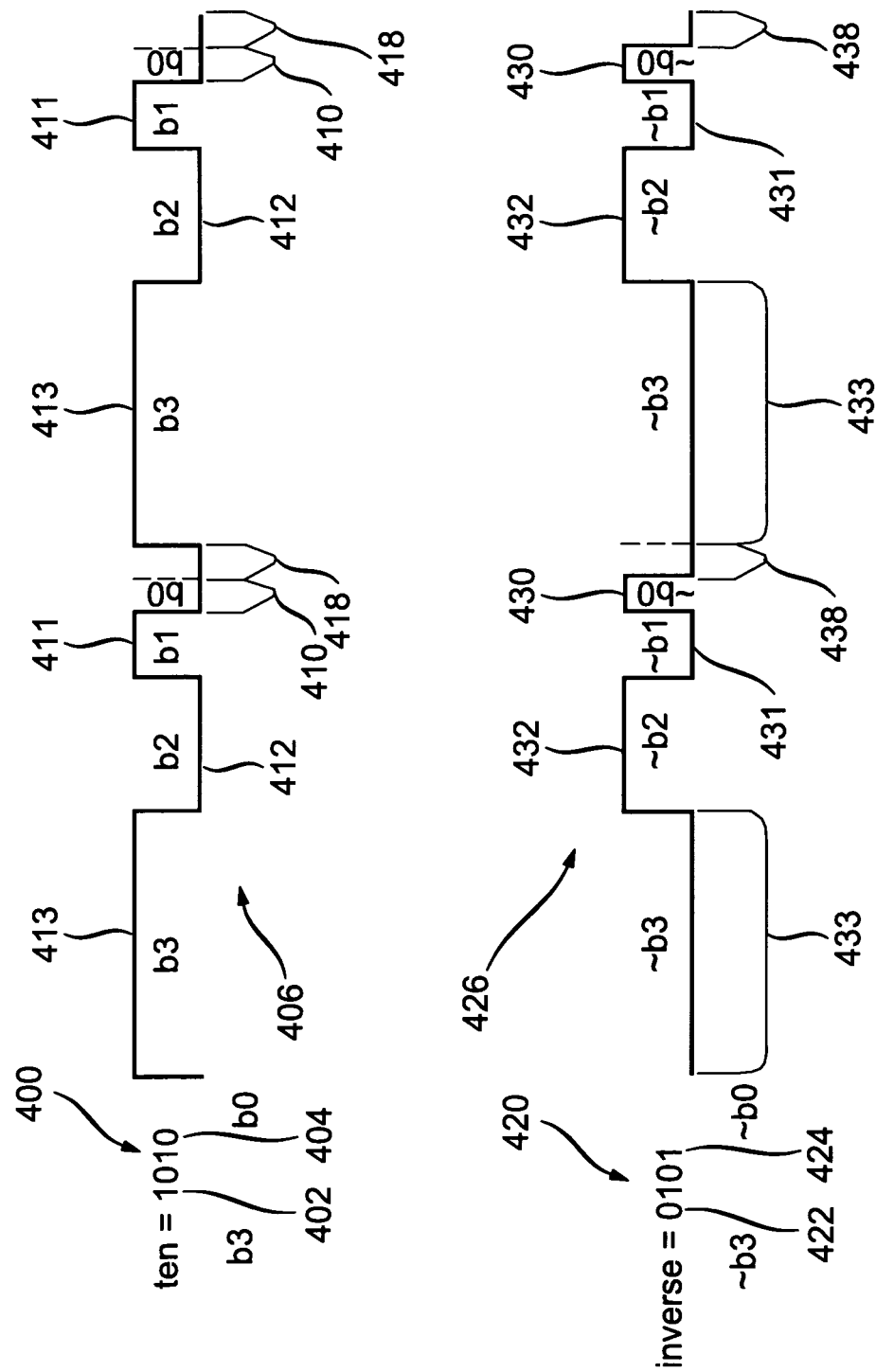
FIG. 4 is a signal diagram associated with a single pixel, which in the preferred embodiment is digital.

FIG. 4 shows waveforms for the control signal for a single pixel mirror of DMD 124. For the purposes of this discussion, the intensity of the pixel is considered to be controlled by a 4-bit binary value, ranging from 0000b representing black to 1111b representing white. A value of 1000b would be approximately 50% gray.

For the individual pixel of DMD 124, in the current image, the current value 400 is ten, or expressed as a 4-bit binary value, 1010b. Each of the four bits in value 400 is individually designated as b0, b1, b2, and b3, with b0 referring to the least significant bit (LSB) 404 and b3 referring to the most significant bit (MSB) 402.

Since a DMD mirror is a binary device (i.e., on or off), to display an intensity other than full on (1111b) or completely off (0000b), the controlling waveform is duty cycle modulated. LSB 404 (b0) establishes the state of the mirror for the shortest amount of time, as in intervals 410. The next most significant bit (b1) establishes the state of the mirror for an amount of time (e.g., interval 411) that is twice as long as interval 410. The next most significant bit (b2) establishes the state of the mirror for an amount of time (e.g., interval 412) that is twice again longer than that controlled by b1. MSB 402 (b3) establishes the state of the mirror for an amount of time (e.g., interval 413) that is twice again longer than that controlled by b2. In this way, each bit has twice the significance of the next lower bit, and half the significance of the next higher bit.

Thus, while displaying pixel value 400, the control signal for a single pixel mirror will resemble waveform 406, with the control level being high for interval 413, corresponding to b3=1, low for interval 412 corresponding to b2=0, high again for interval 411 because b1=1, and low again for interval 410 because b0=0. In some DMD implementations, during a setup interval 418 the control signal for each mirror can be set to zero so as not to influence the image. The waveform 406 can repeat as long as pixel value 400 is appropriate, as described above.

In some embodiments, to prevent long intervals such as 413 from producing a flicker noticeable to observer 116, the control of individual bits having greater significance can be distributed over a number of shorter intervals. For example, rather than MSB 402 (b3) controlling the mirror for a single interval 413 eight times the duration of the interval 410 controlled by LSB 404 (b0), MSB 402 (b3) can instead control the mirror for eight intervals (not shown) of the same duration as the interval 410 controlled by LSB 404 (b0), or could control the mirror for four intervals (not shown) or twice the duration of the interval 410 controlled by LSB 404 (b0). This redistribution of duty cycle control to prevent scintillation artifacts is desirable, but for clarity is not shown in the figures.

When it is necessary to display an intensity inverse of an image, the pixel value 400 is inverted to form inverted pixel value 420. When displaying inverted pixel value 420, MSB 402 (b3) is replaced by its complement, MSB 422 (~b3) and so on for each bit down to LSB 404 (b0) being replaced by its complement, LSB 424 (~b0). As a result, the control waveform 426 is almost the complement of waveform 406, except where setup interval 438 is zero as in internal 418. Thus, while displaying inverse pixel value 420, the control signal for a single pixel mirror will resemble waveform 426, with the control level being low for interval 433 corresponding to ~b3=0, high for interval 432 corresponding to ~b2=1, low again for interval 431 because ~b1=0, and high again for interval 430 because ~b0=1. As before, waveform 426 can repeat as long as inverse pixel value 420 is appropriate, as described above.

Figure 5:
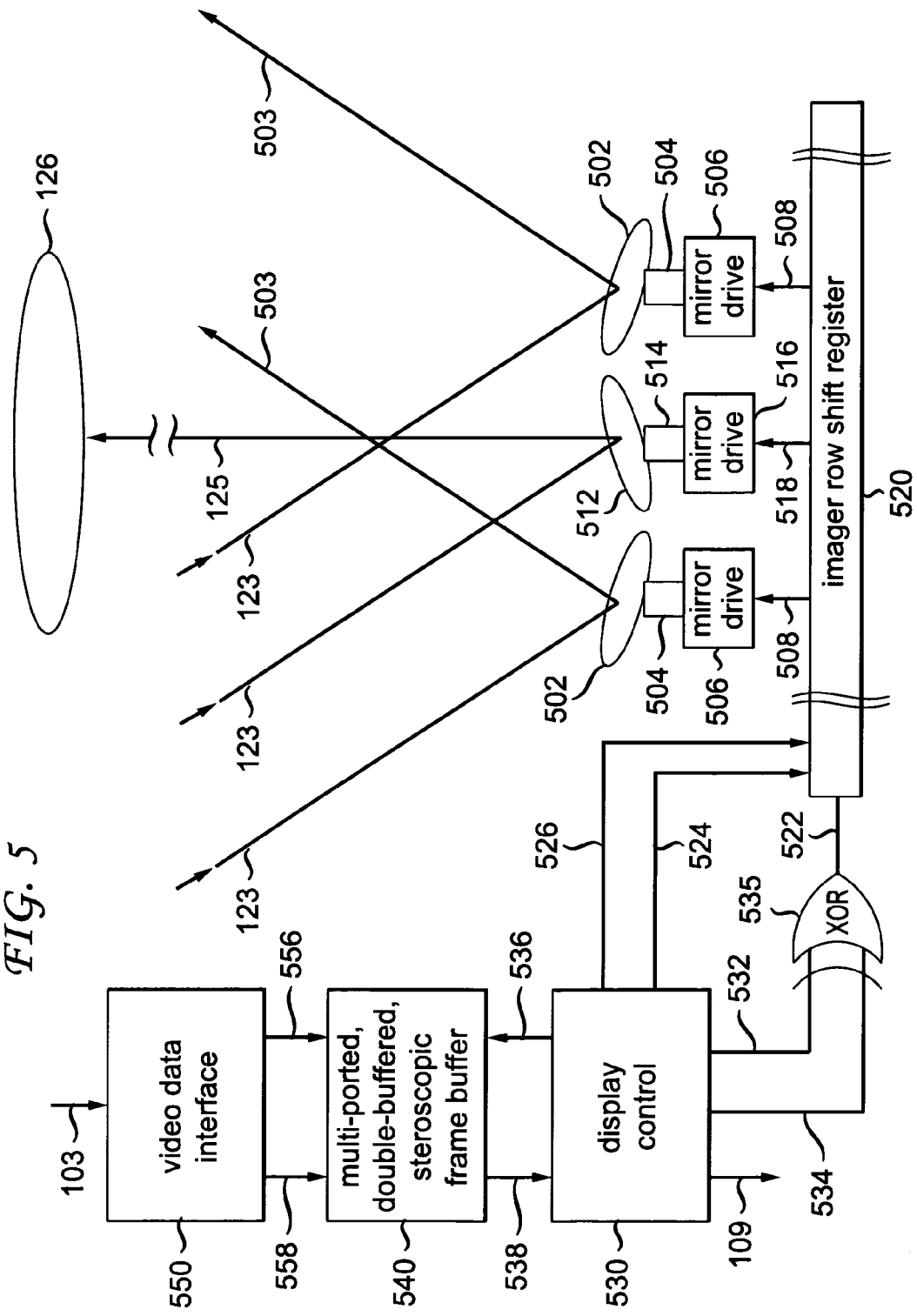
FIG. 5 is a block diagram of a control system and display elements for showing stereoscopic images and the inverse of the images to eliminate ghosting.

Referring to FIG. 5, a preferred embodiment of the control element 130 in conjunction with the preferred use of a DMD display is shown.

Rays of primary light 123 impinge on individual pixel mirrors 502 and 512 of DMD imager 124. Pixel mirrors 502 are in the off state and produce reflections 503 of light 123 that are directed at a beam dump, thus reflections 503 do not result in light on screen 112.

However, pixel mirror 512 is in the on state, and reflections 125 of light 123 striking pixel mirrors in the on state are directed through combiner 126 and ultimately through lens 106 and as projected image 114 that is displayed on screen 112.

Micro-mirrors 502 and 512 are pivotably held by mounts 504 and 514, respectively, and are under the control of mirror drives 506 and 516, respectively. The control of DMD imager micro-mirrors is performed by driver circuitry. In this description, mirror drives 506 are controlled by outputs 508 from imager row shift register 520, which for the purpose of the current figure carry a control value of zero, causing the mirror drives 506 to set corresponding micro-mirrors 502 to an off position. Mirror drive 516 is controlled by output 518 from shift register 520, and for the purpose of the current figure carries a control value of one, causing the mirror drive 516 to set corresponding micromirror 512 to an on position.

Imager row shift register 520 has the following inputs: data to be shifted in is presented at data input 522. The clock signal 524 signals shift register 520 to accept the current data in and shift the whole register 520. However, outputs 508 and 518 are not updated until data out enable signal 526 is asserted. This allows a whole row of mirror settings to be serially shifted into register 520 without modifying the current state of mirrors 502 and 512. When data out enable signal 526 is asserted, mirror drives 506 and 516 can update all mirrors in the row simultaneously.

Data output 518 will have a waveform similar to waveform 406 when micro-mirror 512 is representing a pixel having an intensity value 400. Data output 518 will have a waveform similar to waveform 426 when the inverse intensity value 420 is being displayed.

At this point, it is useful to jump to the other end of the controller 130 pipeline, to discuss how these waveforms are obtained.

Video data interface 550 receives a video signal through connection 103. Video data interface performs whatever manipulation of the video signal is needed to form separate frames left and right eye image data in the native color space and near-linear response of the DMD imagers 124, 124', and 124".

The resulting frames of image data produced by video data interface 550 are stored in frame buffer 540.

Frame buffer is preferably multi-ported so that display control 530 can read from and video data interface 550 can write to frame buffer 540 simultaneously, without mutual interference.

Frame buffer 540 is preferably double-buffered so that while the image(s) being currently written by video data interface 550 are still incomplete, display control 530 has access to the immediately prior image(s) which are complete. This allows display of images without artifacts related to how and when the image(s) are written into frame buffer 540.

Frame buffer 540 is preferably stereoscopic, that is, is able to maintain separate images for the left and right eyes simultaneously, so that when re-flashing image pairs (e.g., alternating second and third flashes 251' with second and third flashes 252') there is no need for video data interface 550 to repopulate frame buffer 540 by redoing any image manipulation.

Video data interface 550 addresses and writes memory in frame buffer 540 through control lines 556, and sends data to frame buffer 540 over data lines 558.

Display control 530 addresses and reads memory in frame buffer 540 through control lines 536, and receives data from frame buffer 540 over data lines 538.

For each color primary, for each row of pixels (only a portion of one row shown) displayed by DMD 124, for each bit in the pixel value, display control 530 selects from the left or right eye image to be currently displayed according to display process 300 (for example at step 308). For example, immediately prior to interval 413, display control 530 would select the MSB (b3) for all pixels controlled by shift register 520 in the current left-eye image, and output them serially on data output 532. Since the left eye image is about to be displayed, control signal 109 for encoder 108 is set to the left eye. Since the interval 413 is not an inverse intensity interval, inversion control line 534 remains low. Thus, data input 522 to shift register 520 will follow data output 532 from display control 530, since while inversion control like 534 remains low, xor gate 535 will act as a non-inverting buffer.

After each selected bit is selected by display control 530 and presented on data output 532, and enough time is allowed for the propagation delay of xor gate 535 and the setup time of data input 522 of shift register 520, display control 530 clocks line 524 to induce shift register 520 to ingest the bit. After the final bit for the current image and row has been clocked into shift register 520, display control 530 can assert the enable output line 526 just as interval 413 begins, whereby all the MSBs (b3) are written to their corresponding mirrors. This can occur simultaneously across all rows of DMD 124, or sequentially, if needed to limit instantaneous power consumption.

A similar procedure occurs immediately prior to each interval of waveform 406, such as interval 412, where all of the next most significant bits (b2) are selected and clocked into shift register 520. By this mechanism, every micro-mirror is controlled by bits of the corresponding pixel value stored in frame buffer 540.

When an intensity inverse image is to be displayed, in accordance with process 300 (for example at step 312), a similar process is used, except that, since the complementary bits (e.g., ~b3) are required, inversion control line 534 is set to high. While this is true, xor gate 535 will act as an inverting buffer, and without altering any values accessed by display control 530 from frame buffer 540, the individual bits sent to mirror drives 506 and 516 will be inverted.

Control line 109 for encoder 108 is updated as called for by process 330. In the case of step 310, control line 109 will command encoder 108 to display to the right eye.

Many alternative embodiments of the disclosure are contemplated. For instance, the inversion of bits could be performed by a mechanism other than by xor gate 535. For example, frame buffer read control lines 536 might include an inverting control signal (not shown), or display control 530 might invert the bits internally. If a display system uses an analog voltage at each pixel to set its value, an analog inverting buffer (not shown) might be used, or the bits of a digital value might be inverted before being converted by a digital-to-analog converter and supplied to the analog pixel drives.

Additionally, it should be pointed out that the invention includes an image intensity inversion device or image compensator device which generates the distinct inverted or compensated images. Further, the inverted images can occur at any of several points in an apparatus which include: a) when data are supplied to the image buffer (which is wasteful of bandwidth), b) when data in the image buffer can be inverted in-place (which is wasteful of processing), c) when a copied inverted image is placed into a second buffer (which is wasteful of hardware), d) when data is being inverted as it is being read (which has some excellent precision tuning capabilities, especially if there is some kinds of non-linear relationship between image data and light output, e) when data are inverted as data at the imager (which presumes a linear relationship between image data and light output), f) when data are inverted within the imager (e.g., by the XOR gate shown and preferred, since the hardware and control are absolutely minimal), or g) when a control signal is used such that there is inverting of control signal to the imager (i.e., flipping the sense of some dither algorithm within a DMD imager).

Also, while the invention has been described through a series of embodiments, it should be understood that specific features can be combined, separated, or performed in a different order. For example, features which have been described as being performed in a plurality of steps or by a plurality of components may be performed in a single step or by a single component.

The invention claimed is:

1. A display comprising:
    video data interface adapted to receive video data and form separate frames of first eye image data and a second eye image data,
    buffer adapted to receive and write into memory the image data from the video data interface;
    image compensator adapted to generate a compensated second eye image data for display to a first eye that is responsive only to the second eye image data and a compensated first eye image data for display to a second eye that is responsive only to the first eye image data; and
    display controller adapted to cause the first eye image data and the compensated second eye image data to be displayed to the first eye, one after the other, and then to cause the second eye image data and the compensated first eye image data to be displayed to the second eye, one after the other.

2. The display of claim 1 further comprising a shift register that control pixels of the display.

3. The display of claim 1 wherein the compensated first and second eye image data are inverse intensity data of the first and second eye image data, respectively.

4. The display of claim 1 wherein the display is a digital micromirror device.

5. The display of claim 4 wherein
    data output to control the micromirrors for the first eye is a waveform pattern for the first eye image data and an inverted form of a waveform of the second eye image data; and
    the data output to control the micromirrors for the second eye is a waveform pattern for the second eye image data and an inverted form of waveform of the first eye image data.

6. The display of claim 1 wherein the display is adapted to flash the first eye image data and the compensated second eye image data combination to the first eye and the second eye image data and the compensated first eye image data combination to the second eye more than once in alternating fashion.

7. The display of claim 1 wherein the display is adapted to flash the first eye image data and the compensated second eye image data combination to the first eye and the second eye image data and the compensated first eye image data combination to the second eye more than once in alternating fashion, wherein the compensated first and second eye image data are inverse intensity data of the first and second eye image data, respectively.

8. The display of claim 5 wherein
    the display is adapted to flash the first eye image data and the compensated second eye image data combination to the first eye and the second eye image data and the compensated first eye image data combination to the second eye more than once in alternating fashion; and
    the compensated first and second eye image data are inverse intensity data of the first and second eye image data, respectively.

9. The display of claim 4 wherein
    data output to control the micromirrors for the first eye is a waveform pattern for the first eye image data and an inverted form of a waveform of the second eye image data; and
    the data output to control the micromirrors for the second eye is a waveform pattern for the second eye image data and an inverted form of waveform of the first eye image data; and
    the intensity associated with the micromirrors is responsive to the waveform patterns and expressed by multi-bit binary values having a most significant bit, intermediate bits and a least significant bit.

10. The display of claim 1 further comprising a balancing means that establishes a ratio of duration of time or intensity that the first and second eye image data are displayed to that of the compensated second eye image data and compensated first eye image data, respectively.

* * * * *